United States Patent [19]

Yamaguchi

[11] Patent Number: 5,615,281

[45] Date of Patent: Mar. 25, 1997

[54] METHOD OF AND APPARATUS FOR GENERATING REDUCED IMAGE

[75] Inventor: Katsuya Yamaguchi, Kyoto, Japan

[73] Assignee: Dainippon Screen Mfg. Co., Ltd., Japan

[21] Appl. No.: 357,060

[22] Filed: Dec. 14, 1994

Related U.S. Application Data

[63] Continuation of Ser. No. 47,158, Apr. 13, 1993, abandoned, which is a continuation of Ser. No. 765,585, Sep. 25, 1991, abandoned.

[30]     Foreign Application Priority Data

Sep. 26, 1990   [JP]   Japan ................................. 2-258359

[51] Int. Cl.$^6$ ................................................. G06T 3/40
[52] U.S. Cl. ........................... 382/162; 382/299; 358/451; 358/528; 395/139
[58] Field of Search ..................................... 358/451, 528; 395/102, 128, 139; 382/164, 298, 299, 259, 162, 167; 345/129

[56]              References Cited

U.S. PATENT DOCUMENTS

| | | | |
|---|---|---|---|
| 4,484,187 | 11/1984 | Brown et al. | 340/703 |
| 4,743,963 | 5/1988 | Abuyama | 358/77 |
| 4,833,531 | 5/1989 | Abe et al. | 358/77 |
| 4,868,552 | 9/1989 | Chang | 345/199 |
| 5,028,991 | 7/1991 | Sekizawa et al. | 358/537 |
| 5,054,099 | 10/1991 | Wakabayashi et al. | 382/47 |
| 5,081,450 | 1/1992 | Lucas et al. | 382/47 |
| 5,121,222 | 6/1992 | Endoh et al. | 358/451 |
| 5,142,272 | 8/1992 | Kondo | 340/703 |
| 5,161,213 | 11/1992 | Knowlton | 352/299 |
| 5,189,510 | 2/1993 | Henaff et al. | 358/524 |
| 5,263,095 | 11/1993 | Kitamura | 382/164 |
| 5,355,447 | 10/1994 | Knowlton | 395/139 |

FOREIGN PATENT DOCUMENTS

| | | |
|---|---|---|
| 0404397 | 12/1990 | European Pat. Off. |
| 58-122593 | 7/1983 | Japan . |
| 61-172482 | 8/1986 | Japan . |

OTHER PUBLICATIONS

English Abstract –61–172482, Multi–Value Picture Information Density Converting Processing Device Aug. 4, 1986.
"Relevant Part of Japanese Patent Laid–Open Gazette No. 58–122593" p. 3, lower right column.
Publication of Japanese Patent JP2277655, dated Nov. 14, 1990 for Image Processor, Inventor: Toshihide.

*Primary Examiner*—Michael T. Razavi
*Assistant Examiner*—Jon Chang
*Attorney, Agent, or Firm*—Ostrolenk, Faber, Gerb & Soffen, LLP

[57]              ABSTRACT

Representative pixel data is extracted for each predetermined region in an original image according to priority of color codes representing colors. The representative pixel data constitute a reduced image. The reduced image is a clear and complete reproduction of the original image without line omissions and distortion of a desired linework. M pieces of pixel data on each scanning line are successively read until the pixel data reaches a maximum value Xmax in a main scanning direction. One pixel data having a color code with the highest priority is selected from the read pixel data according to a priority code table TBL. If the color code is not in the priority table, pixel data at a predetermined position in the region of the read pixel data is selected. The results of selection for two adjacent scanning lines are compared based on the priority code table TBL, and final representative pixel data is selected.

15 Claims, 11 Drawing Sheets

METHOD OF AND APPARATUS FOR GENERATING REDUCED IMAGE

This is a Continuation of Application Ser. No. 08/047,158, filed on April 13, 1993, now abandoned, which is in turn a Continuation of Application Ser. No. 07/765,585 filed on Sep. 25, 1991, now abandoned.

BACKGROUND OF THE INVENTION

1. Field of the Invention

The present invention relates to a method of and an apparatus for generating image data of a reduced image based on multi-color image data consisting of pixel codes, which represent an original image including characters or plane figures.

2. Description of the Prior Art

Since image processing workstations generally deal with image data with a relatively high resolution, such image data is reduced by lowering the resolution before it is output to a printer or a display of a relatively lower resolution. Here the reduction denotes decrease in the number of pixels constituting one image, i.e., a reduced resolution, and does not always mean contraction of an actual image size.

A reduced resolution image generator for generating a reduced image, for example, successively extracts image data of one pixel at a predetermined position from every 2×2 pixel unit in a whole image and forms a reduced image with the extracted image data. The reduction factor is four in this case.

FIG. 1A shows an example of such a prior art reduction process. The image of FIG. 1A includes lines consisting of pixels with a predetermined color code, which are filled with slant lines. Pixel data at the left upper position within each 2×2 pixel unit is extracted. The left upper position is given an open circle in FIG. 1A. For example, pixel data D(1,1) is extracted from the unit including pixel data D(1,1), D(2,1), D(1,2), and D(2,2). Pixel data D(3,1) is extracted from another unit including pixel data D(3,1), D(4,1), D(3,2), and D(4,2). The extraction process is repeated for the whole image, and a reduced image shown in FIG. 1B is generated based on the extracted pixel data.

Since the conventional reduced image generator extracts a pixel data at a predetermined position in each pixel unit, a line one pixel wide sometimes disappears from a resultant reduced image. For example, part of the lines in the original image of FIG. 1A disappears in the reduced image shown in FIG. 1B.

In a linework image including characters or figures, such line missing causes distortion of the characters or plane figures.

SUMMARY OF TEE INVENTION

The present invention provides an improved reduced image generator and a method therefor which generates a reduced image of an original image without line omission or image distortion.

The present invention is directed to a method of and an apparatus for generating reduced image data based on original image data including pixel data representing an original image with respect to each pixel.

The apparatus comprises: a priority memory for storing an order of priority of pixel data;
extraction means for extracting representative pixel data from plural pixel data within each region of a predetermined shape in the original image according to the order of priority; and
reduced image generation means for generating a reduced image represented by the representative pixel data for each region in the original image.

Preferably, the pixel data includes a color code representing a color, and the priority memory stores the order of priority of at least one color code.

The extraction means comprises:
judging means for judging whether the color code of the plural pixel data is stored in the priority memory; and
representative pixel data selection means for selecting the representative pixel data according to the order of priority when at least one color code of the plural pixel data is stored in the priority memory, and for selecting pixel data at a predetermined pixel position in each region as the representative pixel data when the color code of the plural pixel data is not stored in the priority memory.

The region has a rectangular shape defined by M pixels in a main scanning direction and N pixels in a subscanning direction on the original image, where M and N are integers.

According to an aspect of the present invention, the extraction means further comprises:
plural pixel data selection means for selecting plural pixel data within each region of the rectangular shape; and
the representative pixel data selection means selects the representative pixel data from the selected plural pixel data.

According to another aspect of the present invention, the extraction means further comprises:
plural pixel data selection means for successively selecting M pieces of pixel data for pixels located sequentially on a scanning line in the main scanning direction; and
first extraction means for extracting pixel data from the M pieces of pixel data as temporary pixel data according to the order of priority; and wherein
the representative pixel data selection means selects the representative pixel data from N pieces of the temporary pixel data for N pieces of sequential scanning lines as the representative pixel data, the N pieces of the temporary pixel data being allocated to pixels adjacent to one another.

In the embodiment, the priority memory stores a priority table containing the color codes such that the order of priority is determined according to respective addresses of the color codes in the priority memory.

Alternatively, the priority memory stores a priority table containing numbers representing the order of priority such that the color codes correspond to respective addresses of the numbers in the priority memory.

In the latter case, at least two of the numbers representing the order of priority are equal to each other.

According to still another aspect of the present invention, the apparatus further comprises image reading means for optically reading the original image to obtain first image data;
original image generation means for allocating at least one color code to parts of the original image to generate the original image data on the basis of the first image data; and
reduced image outputting means for outputting the reduced image supplied from the reduced image generation means to an external memory.

The extraction means further comprises:
means for adding virtual pixels having virtual pixel data at the periphery of the original image to make the numbers of pixels in the main scanning direction and the subscanning direction integral multiples of M and N, respectively.

DESCRIPTION OF THE PREFERRED EMBODIMENTS

Figure 2:
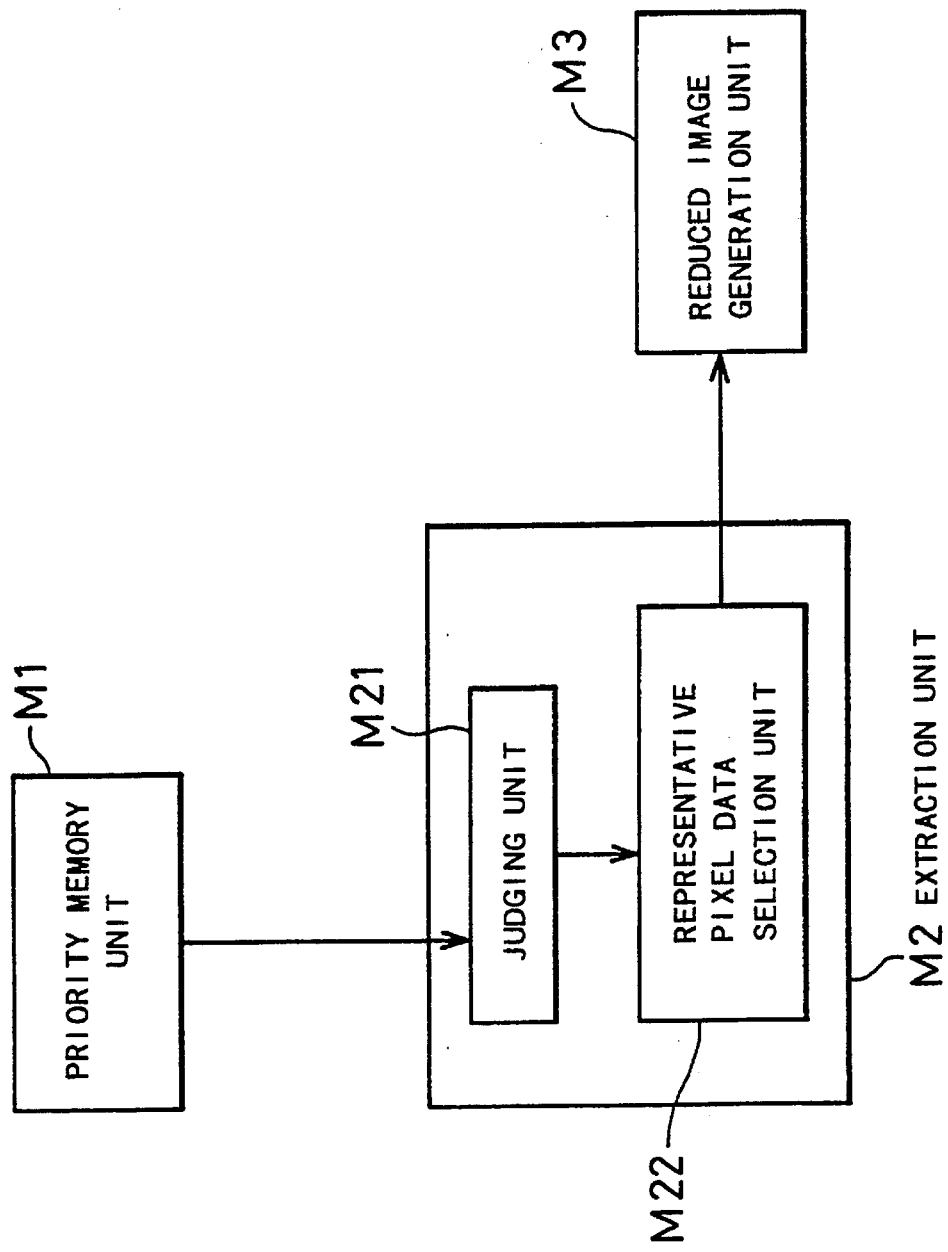
FIG. 2 is a block diagram showing a basic structure of an apparatus for generating a reduced image according to the present invention.

FIG. 2 is a block diagram showing a basic structure of an apparatus for generating a reduced image according to the present invention.

The apparatus includes a priority memory unit M1, an extraction unit M2, and a reduced image generation unit M3. The extraction unit M2 includes a judging unit M21 and a representative pixel data selection unit M22. The priority memory unit M1 stores an order of priority of at least one color code representing a color. The extraction unit M2 extracts representative pixel data from plural pixel data within each region of a predetermined shape in the original image according to the order of priority. The judging unit M21 judges whether a color code of the plural pixel data is stored in the priority memory M1. The representative pixel data selection unit M22 selects the representative pixel data according to the order of priority when at least one color code of the plural pixel data is stored in the priority memory unit M1, and selects pixel data at a predetermined pixel position in each region as the representative pixel data when the color code of the plural pixel data is not stored in the priority memory unit M1. The reduced image generation unit M3 generates a reduced image represented by the representative pixel data for each region in the original image.

Here the color code includes information of a hue, saturation, and density of middle tone color; the color code is not just a hue indicative of primary colors including magenta, cyan, and yellow.

In the apparatus, representative pixel data of a predetermined color with a high priority is extracted. A reduced image reproduced by those representative pixel data represents lineworks of the high priority color without lines missing.

Figure 3:
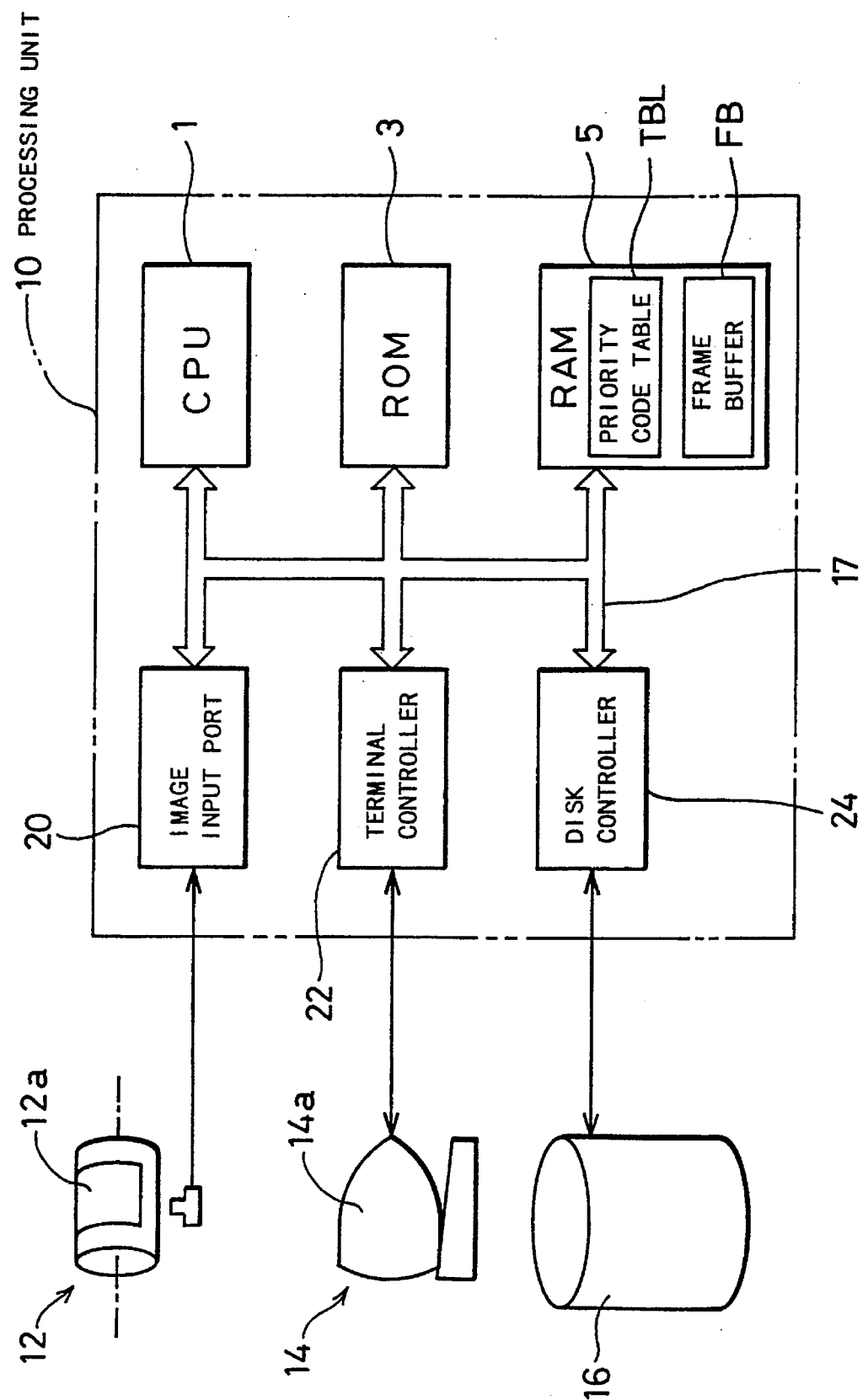
FIG. 3 is a block diagram schematically illustrating structure of a reduced image generator embodying the present invention.

FIG. 3 is a block diagram showing a structure of a reduced image generator of a first embodiment of the present invention.

The reduced image generator includes a processing unit 10, which has a CPU 1, a ROM 3, and a RAM 5, an image scanner 12 for reading an original image to produce raster data, an interactive terminal 14 for giving instructions to execute the data reduction process and for displaying a resultant image, and an external magnetic disk unit 16 for storing various data.

The processing unit 10 is an arithmetic logical operation circuit. The CPU 1 executes various processes according to programs stored in the ROM 3, and transmits data via a common bus 17 from or to an image input port 20 connected to the image scanner 12, a terminal controller 22 connected to the interactive terminal 14, and a disk controller 24 connected to the magnetic disk unit 16.

The image scanner 12 optically scans a black and white image of an original 12a placed on a stand to obtain binary image data, and outputs the binary image data in a run-length data format. Here the original image includes a linework such as a character or a plane figure.

The interactive terminal 14 includes a keyboard, a tablet, and a mouse for giving instructions, and a CRT display 14a for displaying a resultant image.

The CPU 1 executes the following processes according to the instructions input through the terminal 14: storing image data of a high resolution (for example, 2,400 lines/inch) read by the image scanner 12 into the magnetic disk unit 16; specifying a color code representing a color for each image portion to produce a color linework image; and reducing the color linework image by lowering the resolution of the image and outputting the reduced image to the magnetic disk unit 16 or the CRT display 14a. The terminal 14 gives instructions to execute such a series of image processing to the processing unit 10 and displays processed intermediate images or a resultant image on the CRT display 14a.

Figure 4:
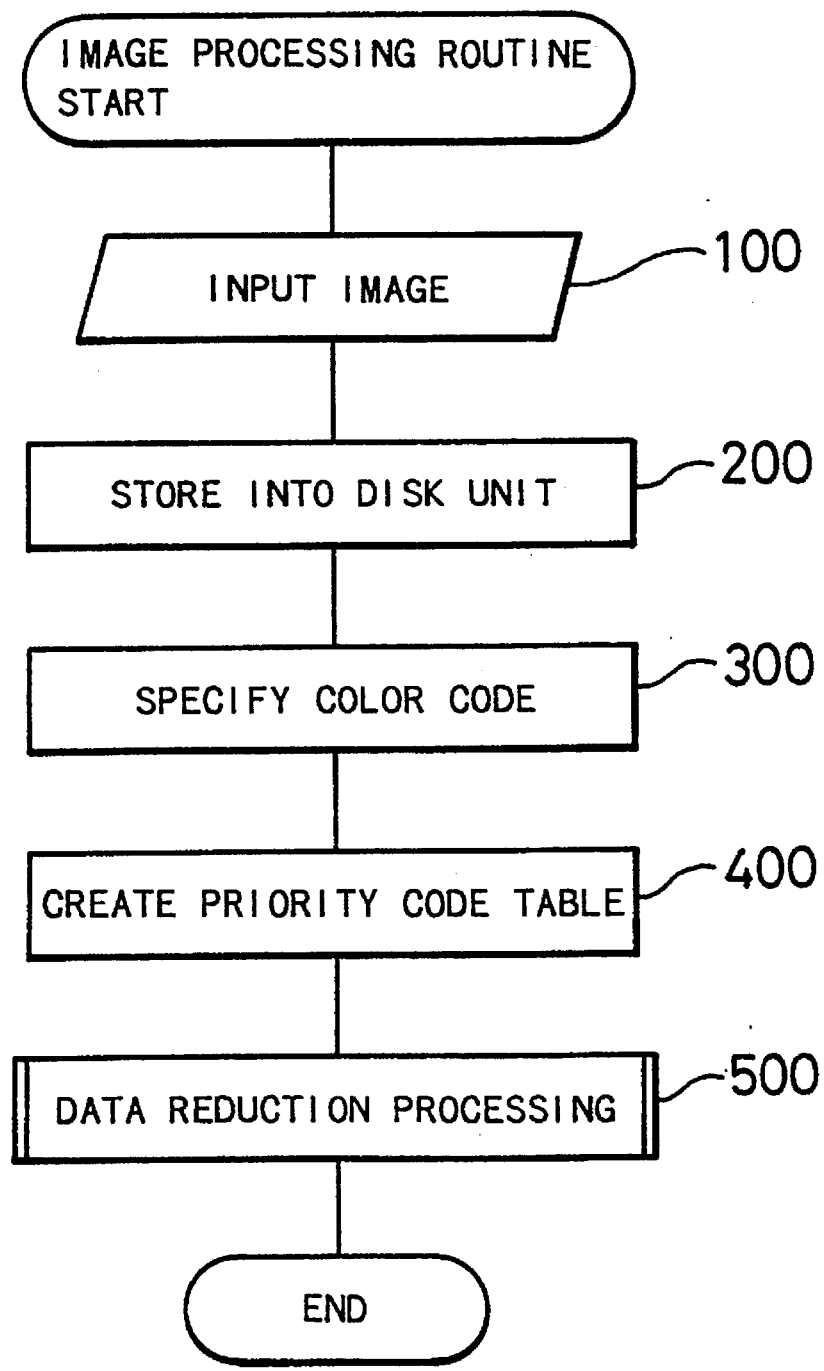
FIG. 4 is a flowchart showing image processing steps by a processing unit 10.
Figure 5A:
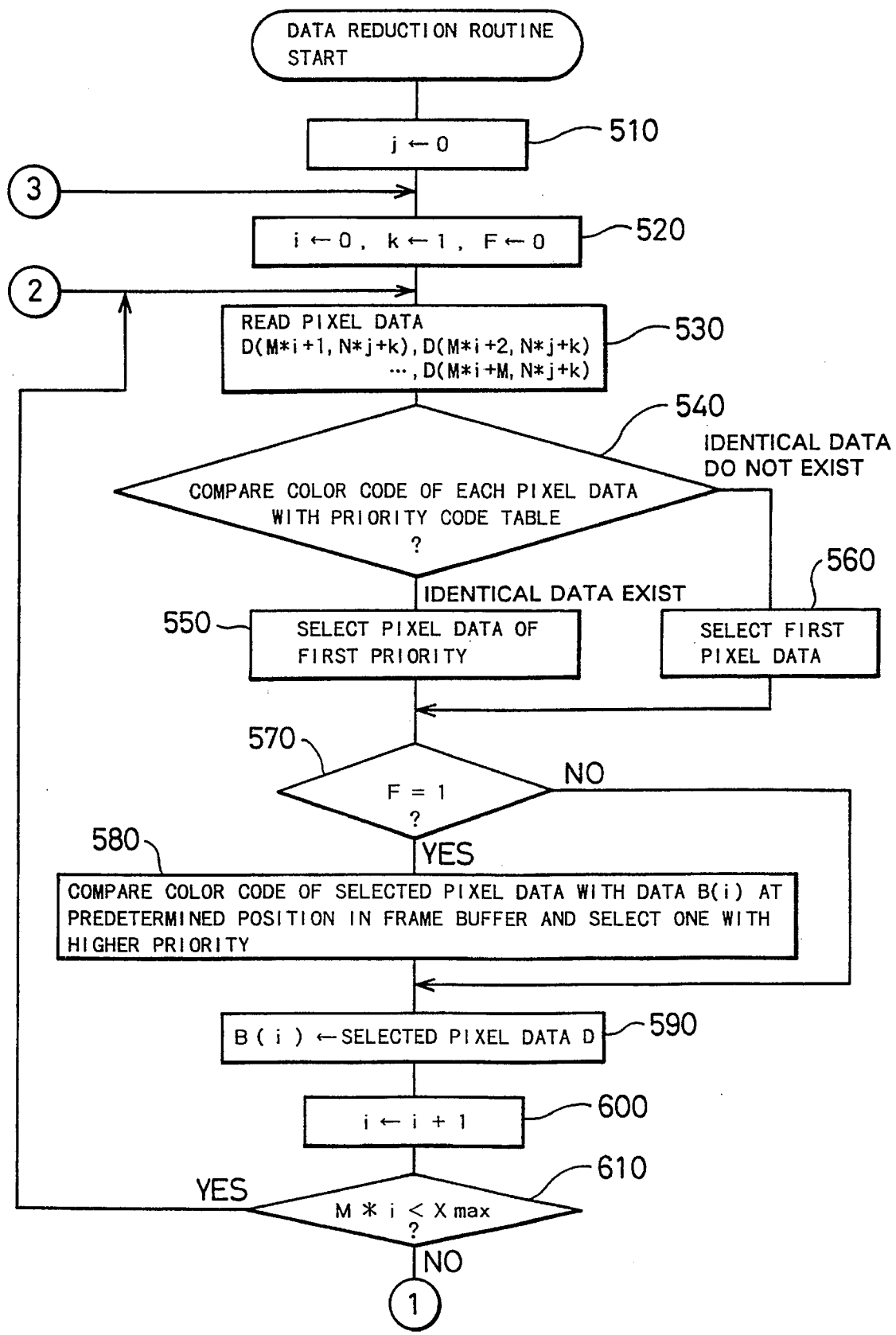
FIGS. 5A and 5B are flowcharts showing steps for generating a reduced image in the first embodiment of the invention.
Figure 5B:
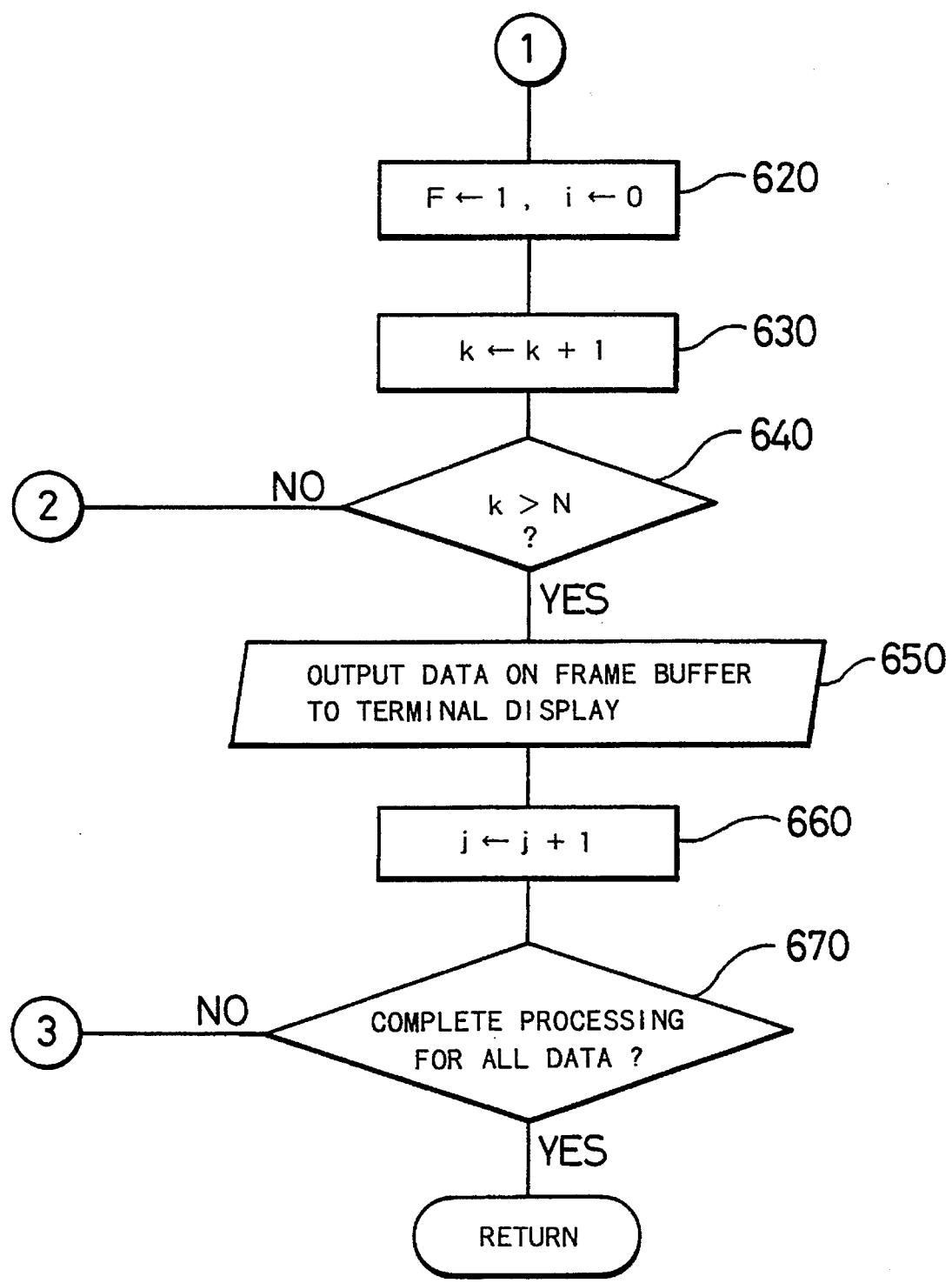

FIGS. 4, 5A, and 5B are flowcharts showing image processing executed by the processing unit 10.

The processing unit 10 firstly executes input processing of image data at step 100 of FIG. 4. In this step, run-length data read by the image scanner 12 is sent to the processing unit 10 via the image input port 20, and developed into raster data in the processing unit 10. The raster data is also stored in a predetermined region of the RAM 5. The raster data is also stored in the magnetic disk unit 16 at step 200.

The program then proceeds to step 300, at which color codes are semi-automatically allocated to image portions of the image represented by the raster data stored in the RAM 5 as follows: The processing unit 10 first automatically allocates a different temporary color or a predetermined color to each closed area of the image. An operator then specifies respective colors for areas other than the closed areas, and modifies the allocated colors, whereby color codes for all of the pixels are determined. In specifying colors, the operator defines an area to be colored with the mouse, and allocates a color code to the area through the keyboard of the terminal 14.

Figure 6:
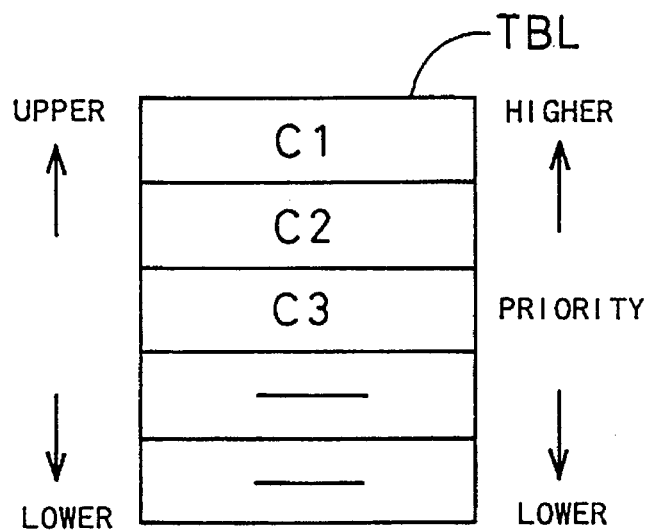
FIG. 6 is an explanatory view illustrating a priority code table stored in a RAM.

The program then proceeds to step 400 at which the processing unit 10 creates a priority code table TBL representing an order of priority of color codes. The priority code table TBL includes at least one color code, and is used for extracting representative pixels which constitute a reduced image. As shown in FIG. 6, the priority of the color code increases as the position of the color code in the table goes up. In the embodiment, color codes indicative of colors C1, C2, and C3 have decreasing priorities in this order. In this embodiment, the priorities of other colors C4 and C5 are not required and thus not registered in the table TBL. At step 400, the operator inputs the color codes indicative of the colors C1, C2, and C3 in the order of priority through the terminal 14. The processing unit 10 creates the priority code table TBL in the RAM 5 based in the input.

At step 500, data reduction processing is executed for reducing the raster data to which color codes are specified.

FIGS. 5A and 5B show details of such data reduction processes. The processing unit 10 firstly clears a variable j to zero at step 510; and clears a variable i and a flag F to zero, and sets a variable k to one at step 520.

The program then proceeds to step 530 at which pixel data D shown below are read out of the raster data. The pixel data is a piece of the raster data for one pixel. The position of the pixel data D is defined by coordinates (x,y) consisting of a variable x in a main scanning direction and a variable y in a subscanning direction. At step 530, M pieces of the following pixel data D, where M is the number of the pixel data, on a first scanning line are read out:
pixel data D(M*i+1, N*j+k),
pixel data D(M*i+2, N*j+k), . . .
pixel data D(M*i+M, N*j+k)
where M and N are integers, and the symbol * denotes multiplication. The integers M and N are reduction factors in the main scanning direction and the subscanning direction, respectively.

For example, if both of the reduction factors M and N are equal to two, the pixel data D(1,1) and D(2,1) are read out at step 530 of the first cycle of processing, where i=0, j=0, and k=1.

The color codes of the pixel data D read out at step 530 are compared with those in the priority code table TBL at step 540. When the color code of the pixel data D is registered in the priority code table TBL, the program process flows to step 550 at which pixel data D with a color code of the highest priority is selected as temporary representative pixel data out of all the pixel data D read out at step 530. On the other hand, when an identical color code does not exist in the priority code table TBL at step 540, the program proceeds to step 560 at which the first pixel data D(M*i+1, N*j+k) is selected as temporary representative pixel data out of all the pixel data D read out at step 530. Alternatively, any one of the pixel data read out at step 530 may be selected at step 560.

Figure 7:
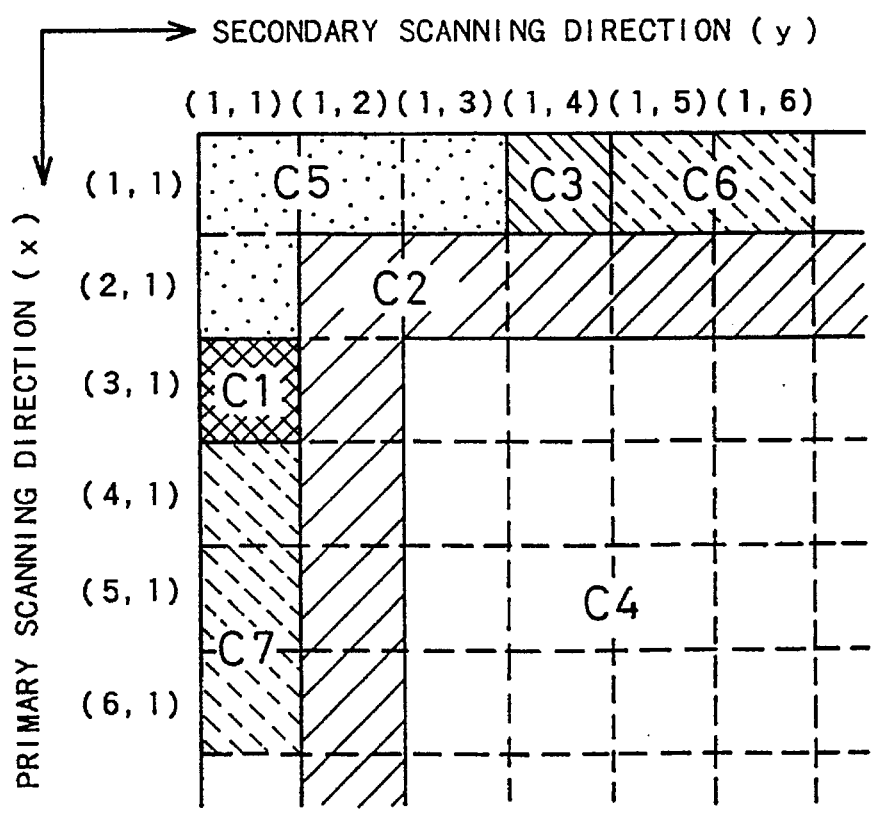
FIG. 7 is an explanatory view showing an example of image data to be processed by the generator of the embodiment.

In the example of FIG. 7, since both of the pixel data D D(1,1) and D(2,1) have a color code C5, the identical color code is not found in the priority code table TBL at step 540 and the pixel data D(1,1) is selected at step 560. On the contrary, when pixel data D(3,1) and D(4,1) are read out at step 530 in the second cycle of processing (where i=1, j=0, and k=1), the identical color code is found in the priority code table TBL step 540, and the pixel data D(3,1) with the color code C1 is selected at step 550.

After step 550 or step 560, it is judged whether the value of the flag F (described later) is equal to one or not at step 570. Since the flag F is cleared to zero at step 520, the answer is NO at step 570, and the program skips step 580 (described later) and proceeds to step 590.

At step 590, the pixel data D selected at step 550 or 560 is stored in a predetermined position of a frame buffer FB in the RAM 5, that is, a position B(i) dependent on the variable i. The program then proceeds to step 600 at which the variable i is increased by one.

At step 610, the product of the reduction factor M multiplied by the variable i is compared with a maximum value Xmax in the main scanning direction. When the product is smaller than Xmax, the program returns to step 530 and steps 530 through 610 are repeated.

Figure 8:
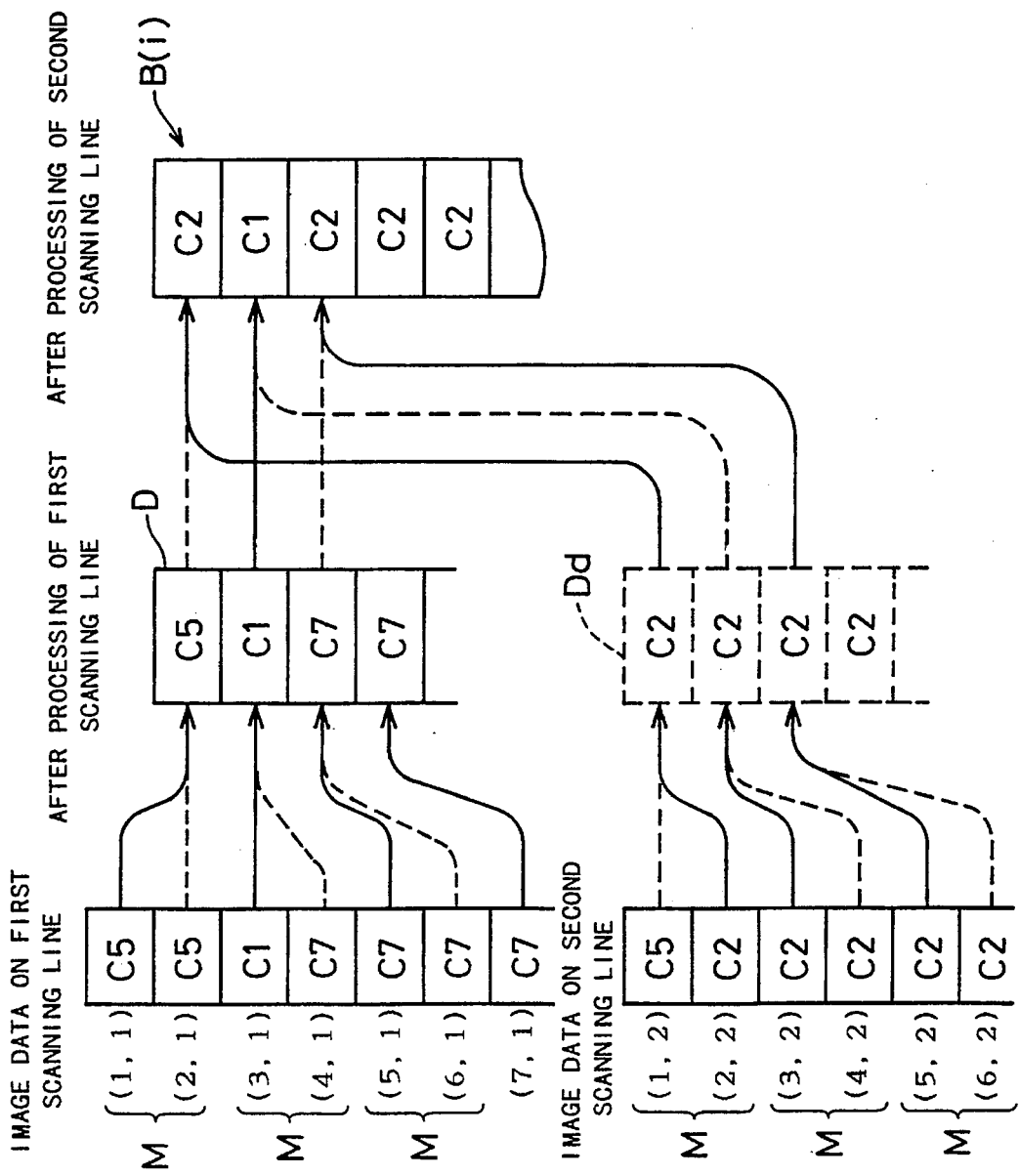
FIG. 8 is an explanatory view illustrating process of data reduction in the first embodiment.

FIG. 8 schematically illustrates the process of pixel data selection. Arrows in solid lines in FIG. 8 denote pixel data which are selected, and those in broken lines denote pixel data which are not selected. In the example of FIG. 7, two pixel data D(1,1) and D(2,1) on a first scanning line, where the coordinate in the subscanning direction y is equal to one, are read out at step 530, and the first pixel data D(1,1) is selected out of the two pixel data at step 560. The next two pixel data D(3,1) and D(4,1) on the first scanning line are then read out at step 530, and the pixel data D(3,1) with the color code C1 of the higher priority is selected at step 550. A pair of pixel data D on the first scanning line are thus successively read out until the pixel data reaches the maximum of the first scanning line Xmax. Pixel data with a color code of the higher priority is then selected according to the priority code table TBL and stored in the predetermined position B(i) in the frame buffer FB.

When the product of the reduction factor M multiplied by the variable i is equal to or greater than the maximum value Xmax at step 610, the program proceeds to step 620 of FIG. 5B. At step 620, the flag F is set to one and the variable i is cleared to zero, and the variable k is increased by one at step 630.

The program then proceeds to step 640 at which the variable k is compared with the reduction factor N in the subscanning direction. When k is not greater than N, the program returns to step 530 and steps 530 through 640 are executed for a second scanning line.

When the value of the flag F is set to one at step 620, the answer is YES at step 570 in the repeated routine, and the program proceeds to step 580, at which the color code of the pixel data selected at step 550 or 560 is compared with that of the temporary representative pixel data D previously stored in the predetermined position B(i) in the frame buffer FB, and the pixel data with the higher priority of the two is selected. This selection is also executed according to the priority code table TBL. When at least one of the color codes of the two selected pixel data exists in the priority code table TBL, pixel data D with a color code of the highest priority is selected. On the other hand, when both of the color codes of the two selected pixel data do not exist in the priority code table TBL, the temporary representative pixel data D stored in the predetermined position B(i) in the frame buffer FB is selected.

The process from step 530 through step 640 is explained in detail based on the example of FIG. 7 along with FIG. 8.

After the processing of the first scanning line, two pixel data D(1,2) and D(2,2) on the second scanning line are read out as shown in FIG. 8. The pixel data D(1,2) has a color code C5 and the pixel data D(2,2) has a color code C2. Since the color code C2 exists in the priority code table TBL, the pixel data D(2,2) with C2 is selected. The next two pixel data D(3,2) and D(4,2) are then read out. Since the two pixel data have the same color code C2, the first pixel data D(3,2) is selected. A pair of pixel data D on the second scanning line are thus successively read out until the pixel data reaches the maximum Xmax in the main scanning direction.

The pixel data D selected on the second scanning line are successively compared with the temporary representative pixel data D on the first scanning line previously stored in the frame buffer FB. The pixel data of the higher priority of the two is then stored or rewritten in the predetermined position B(i) in the frame buffer FB at steps 580 and 590. In the example of FIG. 7, the pixel data D(2,2), D(3,2), and D(5,2) which are selected on the second line are compared with the temporary representative pixel data D on the first scanning line previously stored in the frame buffer FB. The pixel data D with the color codes C2, C1, C2, . . . are thus stored in line in the frame buffer FB after the processing of the first and second scanning lines.

When the variable k is judged to be greater than the reduction factor N at step 640, the program proceeds to step 650 at which image data in the frame buffer FB is output to the magnetic disk unit 16 or the CRT display 14a of the terminal 14 (more precisely, a refresh memory of the CRT). Namely, reduced image data including only one scanning line obtained by processing the first and second scanning lines is output, for example, to the CRT display 14a.

The program then proceeds to step 660 at which the variable j is increased by one, and to step 670 at which it is judged whether processing of all the raster data is completed. When the answer is NO, the program returns to step 520, and steps 520 through 670 are repeated. By repeated execution of the routine, reduced image for the third and fourth scanning lines and those for the fifth and sixth scanning lines are successively displayed, for example, on the CRT display 14a.

When completion of the processing is recognized at step 670, the program goes to the end of FIG. 4 and exits the routine.

As described above, in the data reduction process of FIGS. 5A and 5B, a pair of pixel data D on the first scanning line are successively read out until the pixel data reaches the maximum Xmax in the main scanning direction. Pixel data D with a color code of the higher priority of the two is selected according to the priority code table TBL and stored in the frame buffer FB as temporary reduced image data. The same processing is repeated for the second scanning line, and pixel data D with a color code of the higher priority of the two is selected. The selected pixel data D of the second scanning line is then compared with that of the first scanning line previously stored in the frame buffer FB. From the two pixel data selected in the first and second scanning lines, the pixel data with a color code of the higher priority is stored in the frame buffer FB as representative pixel data and output, for example, to the CRT display 14a. Such processing is repeated for the third and fourth scanning lines, the fifth and sixth scanning lines, and the following scanning lines, and the selected pixel data are successively displayed on the CRT display 14a.

When the maximum Xmax in the main scanning direction is not an integral multiple of the reduction factor M or when a maximum value Ymax in the subscanning direction is not an integral multiple of the reduction factor N, virtual pixels are added to the periphery of the image so as to change the number of pixels in the main scanning direction and that of the subscanning direction into integral multiples of M and N, respectively. For the virtual pixels, pixel data with a color code of the lowest priority is allocated for example. Accordingly, the pixel data of the higher priority is efficiently extracted even when Xmax or Ymax is not an integral multiple of M or N.

By the data reduction process described above, pixel data D with a desired color code is extracted from a pixel unit including M×N pixels as representative pixel data for a reduced image. The resultant reduced image is a clear, complete reproduction of the original image without line omissions and distortion of the desired linework part. Since the original color image includes characters or plane figures in the above embodiment, part of the desired linework sometimes disappears according to the conventional method and the resultant reduced image is far different from the original image. The method of the embodiment, however, allocates a higher priority to the color code of a desired linework, thus forming a reduced image of improved reproducibility.

Figure 1A:
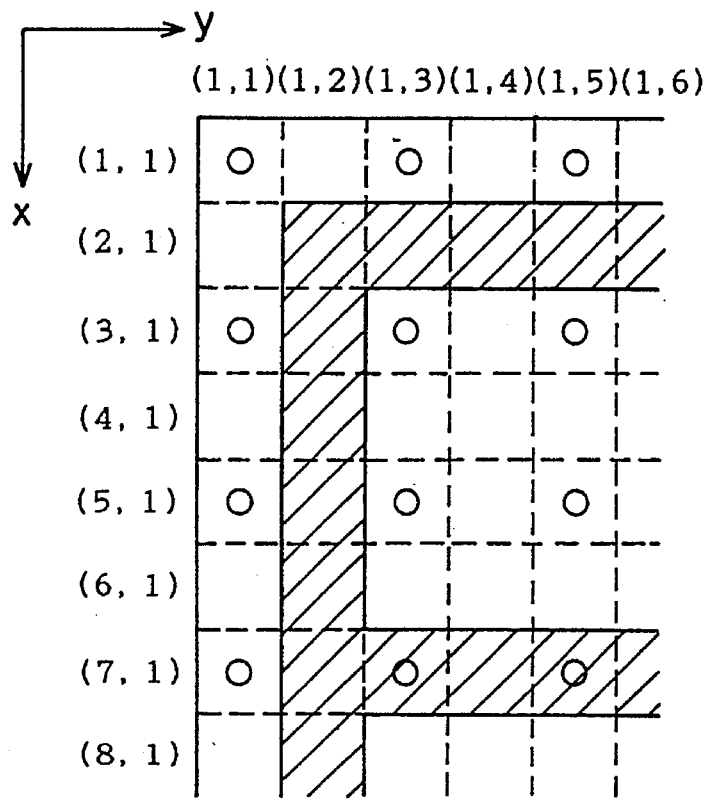
FIG. 1A is an explanatory view showing an example of an original linework image.
Figure 1B:
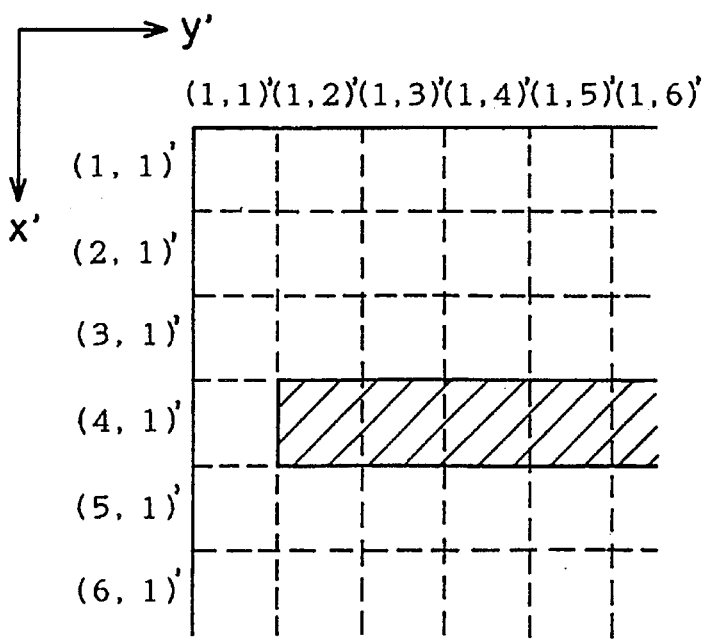
FIG. 1B is an explanatory view showing an example of a reduced image generated by a prior art apparatus.
Figure 9:
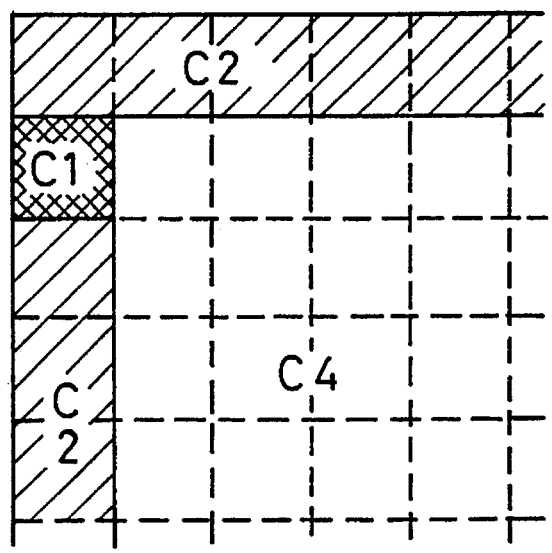
FIG. 9 is an explanatory view showing an example of a resultant reduced image produced by processing the image data of FIG. 7 with the generator of the embodiment.
Figure 10:
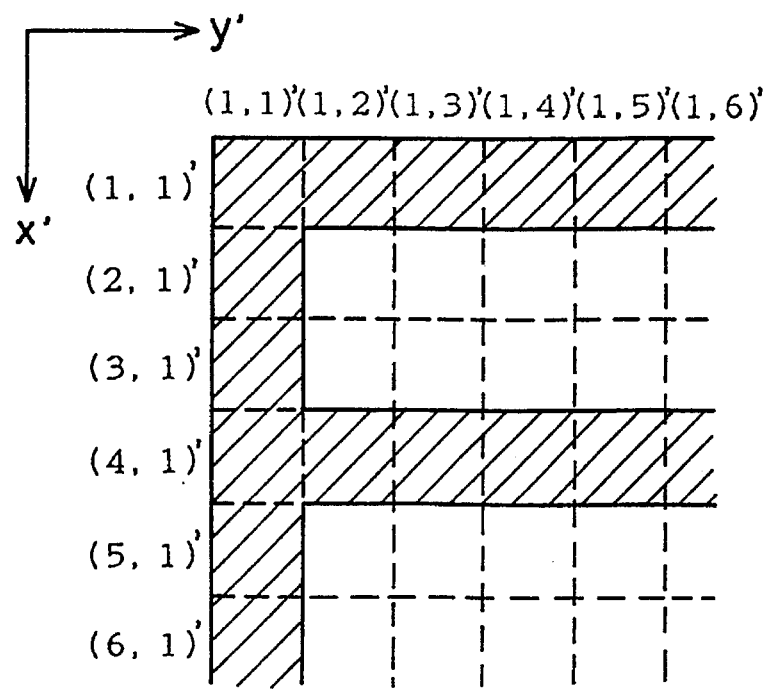
FIG. 10 is an explanatory view showing another example of a reduced image produced by the generator of the embodiment.

The advantage of the embodiment is also seen in FIG. 9 illustrating a resultant reduced image produced from the image data of FIG. 7, and in FIG. 10 illustrating a resultant reduced image produced by giving the highest priority to the color code of the pixels which are shaded in FIG. 1A. Namely, the desired linework in the original image is completely reproduced.

Another advantage of the embodiment is that the color code (the value on the priority code table TBL) of the desired linework for a reduced image is freely changed through the terminal 14, thus forming any desired reduced image.

A second embodiment of the invention is described below in connection with FIG. 11.

The second embodiment is similar to the first embodiment except for the data reduction process executed by the CPU 1; the apparatus has the same structure as FIG. 3 and executes the same main routine as FIG. 4.

Figure 11:
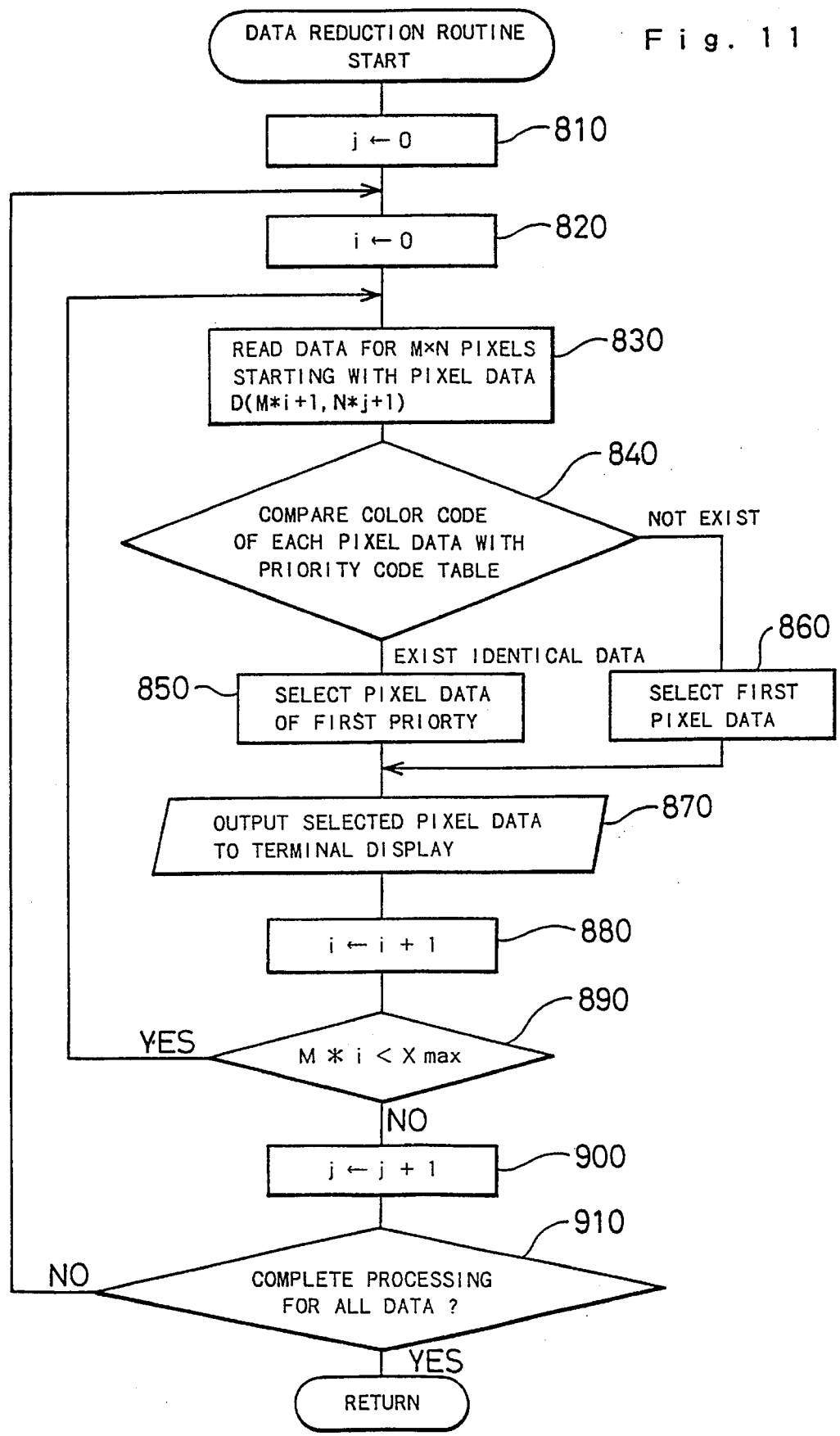
FIG. 11 is a flowchart illustrating steps for generating a reduced image in a second embodiment of the invention.

Steps 810, 820, 840, 850, 860, 880, 890, 900, and 910 of FIG. 11 are respectively the same as steps 510, 520, 540, 550, 560, 600, 610, 660, and 670 of FIGS. 5A and 5B.

When the program starts the routine, variables j and i are cleared to zero at steps 810 and 820.

Pixel data for M×N pixels starting from D(M*i+1, N*j+1) are successively read out of image data at step 830. Here M and N respectively denote reduction factors in a main scanning direction and subscanning direction. When both of the reduction factors M and N are equal to two, pixel data D(1,1), D(2,1), D(1,2), and D(2,2) are read out in the first cycle of the routine, where i=0 and j=0. A collection of four pixel data is thus successively read out in the repetition of the routine; in the second cycle, pixel data D(3,1), D(4,1), D(3,2) and D(4,2) are read out.

The color codes of the pixel data D read out at step 830 are compared with those in the priority code table TBL stored in the RAM 5 at step 840. When at least one color code of the four pixel data D exists in the priority code table TBL, the program proceeds to step 850 at which pixel data D with a color code of the highest priority is selected out of the four pixel data D. On the other hand, when no identical color codes are found in the priority code table TBL at step 840, the program proceeds to step 860 at which the first pixel data D(M*i+1, N*j+1) is selected out of the four pixel data D read out at step 830.

Figure 12:
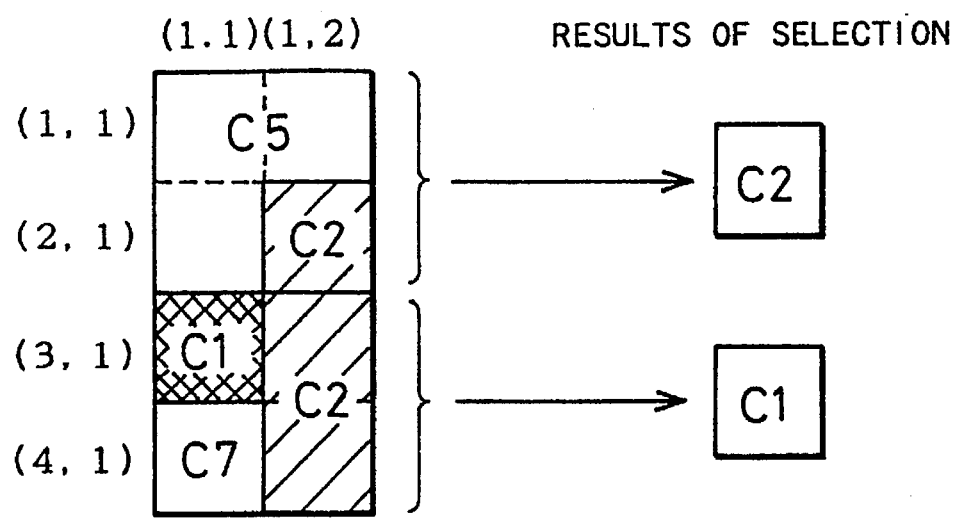
FIG. 12 is an explanatory view illustrating the process of data reduction in the second embodiment.

In the example of FIG. 7, the pixel data D(2,2) with the color code C2 is selected out of the four pixel data D(1,1), D(2,1), D(1,2), and D(2,2), and the pixel data D(3,1) with the color code C1 is selected out of the pixel data D(3,1), D(4,1), D(3,2), and D(4,2) as shown in FIG. 12.

The program then proceeds to step 870 at which the pixel data selected is output as the representative pixel data to the CRT display 14a.

At step 880, the variable i is increased by one, and at step 890 the product of the reduction factor M and the variable i is compared with the maximum Xmax in the main scanning direction. When the product is smaller than Xmax, the program returns to step 830, and steps 830 through 890 are repeated. By repeated execution of these steps, representative pixel data D(i) is selected for every M×N pixel unit along the main scanning direction, and is output to the CRT display 14a.

The variable j is then increased by one at step 900, and it is judged whether processing of all the raster data is completed or not at step 910. When the answer is NO, the program returns to step 820, and steps 820 through 910 are repeated. Pixel data of the highest priority are thus extracted for every M×N pixel unit in the whole image to form a reduced image on the CRT display 14a. When the processing of the whole image is completed at step 910, the program exits the routine.

The reduced image on the CRT display 14a of the second embodiment includes a linework with a color of the highest priority, and is a complete reproduction of the original image without line omissions and distortion of the desired linework, as in the first embodiment.

Figure 13:
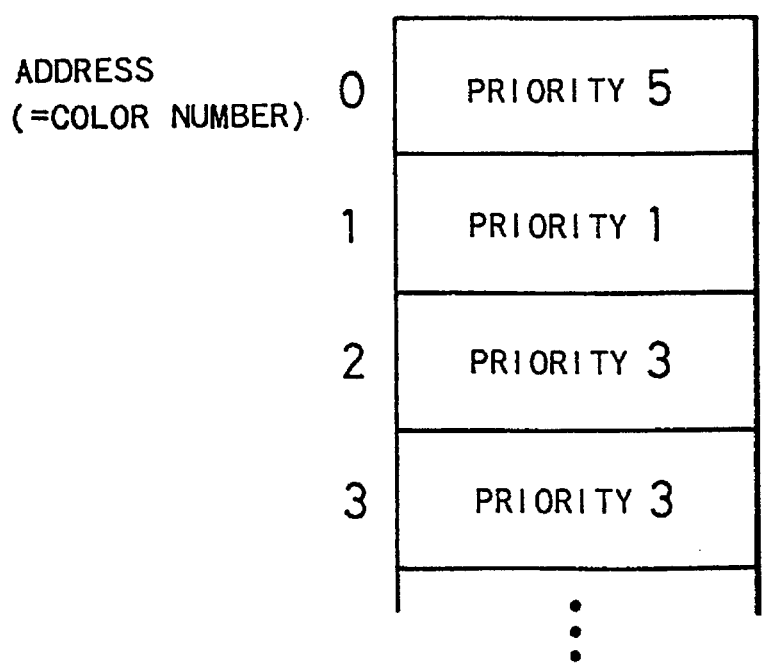
FIG. 13 is an explanatory view showing another example of a priority code table.

Although in the priority code table TBL the priority increases as the position of the color code goes up in the first and second embodiments, another table can be used instead where only the order of priority is registered at each address of the RAM 5 as shown in FIG. 13 and where a color code is allocated to each address. In such a table, the equivalent priority can be given to two or more color codes. The allocation of the equivalent priority to plural color codes may be admitted either when image data with color codes of the equivalent priority are not adjacent to one another or when either of those adjacent image data can be selected without any trouble.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for generating a reduced image based on original image data representing an original image having linework including plural pixels, the original image data including pixel data for each pixel in said original image, each said pixel data expressed in one of plural color codes, the apparatus comprising:

an image memory for storing original image data representing said original image, said original image being divided into a plurality of regions each having a predetermined shape;

a priority memory for storing an order of priority of said color codes;

extraction means for extracting only one representative pixel data from plural pixel data within each region of a predetermined shape in said original image according to said order of priority, wherein said extraction means includes judging means for judging whether said color code of each of said plural pixel data is stored in said priority memory and representative pixel data selection means for selecting said only one representative pixel data having a color code with a highest priority according to said order of priority when at least one said color code is stored in said priority memory; and reduced image generation means for receiving said extracted only one representative pixel data and displaying a reduced image without omission of lines in the linework based upon said extracted only one representative pixel data for each region in said original image, said representative pixel data selection means of said extraction means further comprising:

means for selecting pixel data at a predetermined pixel position in each region as said representative pixel data when said color code is not stored in said priority memory.

2. An apparatus in accordance with claim 1, wherein:

said region has a rectangular shape defined by M pixels in a main scanning direction and N pixels in a subscanning direction on said original image, where M and N are integers.

3. An apparatus in accordance with claim 2, wherein:

said extraction means further comprises plural pixel data selection means for selecting said plural pixel data within each region of said rectangular shape; and said representative pixel data selection means selects said representative pixel data from the selected plural pixel data.

4. An apparatus in accordance with claim 2, wherein said extraction means further comprises:

plural pixel data selection means for successively selecting M pieces of pixel data for pixels located sequentially on a scanning line in the main scanning direction; and first extraction means for extracting according to said order of priority pixel data from said M pieces of pixel data as temporary pixel data; and wherein:

said representative pixel data selection means selects said representative pixel data from N pieces of the temporary pixel data for respective ones of N sequential scanning lines, said N pieces of said temporary pixel data being allocated to pixels adjacent to one another.

5. An apparatus in accordance with claim 4, wherein:

said priority memory stores a priority table containing said color codes of each of said pixel data such that said order of priority is determined according to respective addresses of said color codes in said priority memory.

6. An apparatus in accordance with claim 4, wherein:

said priority memory stores a priority table containing numbers representing said order of priority such that said color codes correspond to respective addresses of said numbers in said priority memory.

7. An apparatus in accordance with claim 6, wherein:

at least two of said numbers representing said order of priority are equal to each other.

8. An apparatus in accordance with claim 2, further comprising:

image reading means for optically reading said original image to obtain first image data;

original image generation means for allocating at least one said color code to each pixel of said original image to generate said original image data on the basis of said first image data; and reduced image outputting means for outputting said reduced image supplied from said reduced image generation means to an external memory.

9. An apparatus in accordance with claim 8, wherein:

said extraction means further comprises:

means for adding virtual pixels having virtual pixel data at the periphery of said original image to make the numbers of pixels in the main scanning direction and the subscanning direction integral multiples of M and N, respectively.

10. A method of generating a reduced image based on original image data representing an original image having linework including plural pixels, the original image data including pixel data for each pixel in said original image, each said pixel data expressed in one of plural color codes, the method comprising the steps of:

storing the original image data representing said original image, said original image being divided into a plurality of regions each having a predetermined shape and (a) determining an order of priority of said color codes;

(b) extracting only one representative pixel data having a color code with a highest priority according to said order of priority from plural pixel data within each region of a predetermined shape in said original image according to said order of priority, wherein step (b) includes the steps of:

(b-1) judging whether said color code of each of said plural pixel data is stored in a priority memory; and (b-2) selecting said only one representative pixel data according to said order of priority when at least one said color code is stored in said priority memory;

(c) displaying a reduced image without omission of lines in the linework based upon said extracted only one representative pixel data for each region in said original image;

said step (b-2) further including selecting pixel data at a predetermined pixel position in each region as said representative pixel data when said color code is not stored in said priority memory.

11. A method in accordance with claim 10, wherein:

said region has a rectangular shape defined by M pixels in a main scanning direction and N pixels in a subscanning direction on said original image, where M and N are integers.

12. A method in accordance with claim 11, wherein said step (b) further comprises the step of:

(b-3) selecting said plural pixel data within each region of said rectangular shape before said step (b-2); and said step (b-2) further comprises selecting said representative pixel data from the selected plural pixel data.

13. A method in accordance with claim 11, wherein before said step (b-2), said step (b) further comprises the steps of:

(b-3) successively selecting M pieces of pixel data for pixels located sequentially on a scanning line in the main scanning direction; and (b-4) extracting according to said order of priority pixel data from said M pieces of pixel data as temporary pixel data; and wherein:

said step (b-2) further comprises selecting said representative pixel data from N pieces of said temporary pixel data for respective ones of N sequential scanning lines, said N pieces of said temporary pixel data being allocated to pixels adjacent to one another.

14. A method in accordance with claim 11, further comprising the steps of:

(d) optically reading said original image to obtain first image data before said step (a);

(e) allocating at least one said color code to each pixel of said original image to generate said original image data on the basis of said first image data before said step (a); and (f) outputting said reduced image to an external memory after said step (c).

15. A method in accordance with claim 14, wherein said step (b) further comprises the step of:

(g) adding virtual pixels having virtual pixel data at the periphery of said original image to make the numbers of pixels in the main scanning direction and the subscanning direction integral multiples of M and N, respectively.

* * * * *